(12) United States Patent
Ma et al.

(10) Patent No.: US 12,450,945 B1
(45) Date of Patent: Oct. 21, 2025

(54) FINGERPRINT IMAGE GENERATING METHODS AND DEVICES

(71) Applicant: Samsung Electronics Co., Ltd., Suwon-si (KR)

(72) Inventors: Chao Ma, Xi'an (CN); Pengtao Zhang, Xi'an (CN); Chao Wei, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/915,483

(22) Filed: Oct. 15, 2024

(30) Foreign Application Priority Data

Sep. 19, 2024 (CN) .......................... 202411311474.8

(51) Int. Cl.
G06V 40/16 (2022.01)
G06V 10/75 (2022.01)
G06V 40/40 (2022.01)

(52) U.S. Cl.
CPC .......... G06V 40/172 (2022.01); G06V 10/751 (2022.01); G06V 40/45 (2022.01)

(58) Field of Classification Search
CPC ..... G06V 40/172; G06V 10/751; G06V 40/45
See application file for complete search history.

(56) References Cited

U.S. PATENT DOCUMENTS

| 5,937,097 | A | 8/1999 | Lennon |
| 9,076,191 | B2 | 7/2015 | Bergner et al. |
| 10,896,486 | B2 | 1/2021 | Yang et al. |
| 11,451,877 | B2 | 9/2022 | Neumeier et al. |
| 2004/0240562 | A1 | 12/2004 | Bargeron et al. |
| 2010/0312763 | A1* | 12/2010 | Peirce ................... G06V 10/764 707/723 |
| 2015/0036894 | A1* | 2/2015 | Matsunami .......... G06V 10/449 382/115 |
| 2019/0205433 | A1* | 7/2019 | Lo ......................... G06F 18/211 |
| 2023/0004754 | A1 | 1/2023 | Fan et al. |
| 2023/0075233 | A1 | 3/2023 | Riazi et al. |

FOREIGN PATENT DOCUMENTS

KR  10-2023-0073644 A  5/2023

* cited by examiner

*Primary Examiner* — Abhishek Sarma
(74) *Attorney, Agent, or Firm* — Fish & Richardson P.C.

(57) ABSTRACT

A fingerprint image generating method including: obtaining M sample fingerprint images; generating N approximate images according to N target similarities based on each of the M sample fingerprint images, each of the N target similarities being a similarity between respective ones of the N approximate images and the M sample fingerprint images on which the respective one of the N approximate images is based; analyzing differences between each one of the M sample fingerprint images and the respective one of the N approximate images, to obtain (M×N) difference parameters; statistically calculating the M difference parameters respectively associated with P similarities among the N target similarities respectively, to obtain difference statistical parameters respectively corresponding to the P similarities; obtaining a reference fingerprint image; and generating simulated fingerprint images respectively corresponding to the P similarities based on the reference fingerprint image and the difference statistical parameters respectively corresponding to the P similarities.

21 Claims, 12 Drawing Sheets

| A number of iterations | reference fingerprint image | 1000 | 3000 | 5000 | 6000 |
|---|---|---|---|---|---|
| liveness score | 37.026215 | 12.451935 | 53.164673 | 88.077545 | 92.628479 |
| matching score | / | 589325 | 1120854 | 1256478 | 3776121 |
| fingerprint image |  |  |  |  |  |

FINGERPRINT IMAGE GENERATING METHODS AND DEVICES

CROSS-REFERENCE TO RELATED APPLICATION

This application claims priority under 35 U.S.C. § 119 to Chinese Patent Application No. 202411311474.8 filed on Sep. 19, 2024, in the State Intellectual Property Office of the P.R.C., the contents of which are incorporated herein by reference in their entirety.

TECHNICAL FIELD

The present inventive concepts relate, in general, to fingerprint recognition, and more particularly, relate to fingerprint image generating methods and devices.

BACKGROUND

Everyone's fingerprints are unique. Fingerprint recognition technology utilizes this feature to achieve identity verification by collecting, processing, analyzing, and comparing fingerprint images. However, with the development of technology, the phenomenon that malicious attackers deceive fingerprint recognition systems by creating fake fingerprints through forgery, imitation, or other means is gradually emerging. Therefore, a Presentation Attack Detection (PAD) algorithm has emerged in this field, which is used to identify fake fingerprints before formally verifying an identity, and may only authenticate the fingerprints that have been identified (e.g., determined to be true fingerprints) to resist presentation attacks.

The PAD algorithm typically uses a Liveness Score to measure activities that may exist in a fingerprint image (such as forgery, attacks, etc.). The Liveness Score is usually between 0 and 1, or between 0 and 100, and the higher the value, the more likely the fingerprint image is to be real and valid. In order to test the PAD algorithm, it may be necessary or advantageous to use a large number of fingerprint images with different Liveness Scores. A traditional method is to construct Presentation Attack Instrument (PAI) materials based on real fingerprint samples collected from volunteers. This process is multi-step and time-consuming, and may require compliance with relevant laws and ethical standards, resulting in high costs and difficulty in covering all Liveness Score value ranges.

Some methods for directly generating electronic fingerprint images have been proposed in related technology, such as training an adversarial patch generator to generate adversarial patches and inserting them into sample images to generate artificial adversarial images. This method can generate visually realistic fingerprint images, but it does not have predictability in the results of PAD detection and cannot generate fingerprint images with specified Liveness Scores. At the same time, this method requires a large number of samples to train adversarial networks, and still has the problem of high cost.

Therefore, how to quickly obtain fingerprint images of different Liveness Scores at low cost is an urgent problem that needs to be solved, or would be advantageous to solve, in this field.

SUMMARY

Some example embodiments of the present inventive concepts provide a fingerprint image generating method and device that may quickly obtain fingerprint images of different Liveness Scores at low cost.

According to some example embodiments, there is provided a fingerprint image generating method, including: obtaining M sample fingerprint images; generating N approximate images according to N target similarities based on each of the M sample fingerprint images, each of the N target similarities being a similarity value between a respective one of the N approximate images and a respective one of the M sample fingerprint images on which the respective one of the N approximate images is based, M and N being integers greater than 1; analyzing a difference between each one of the M sample fingerprint images and the respective one of the N approximate images, to obtain (M×N) difference parameters, each one of the (M×N) difference parameters quantifying a difference between each one of the respective M sample fingerprint images and the respective N approximate images, each one of the (M×N) difference parameters being associated with the similarity value between the respective one of the M sample fingerprint images and the respective N approximate images, such that each of the N target similarities is associated with M difference parameters; statistically calculating the M difference parameters respectively associated with P similarities among the N target similarities respectively to obtain difference statistical parameters respectively corresponding to the P similarities, P being an integer greater than or equal to 1; obtaining a reference fingerprint image; and generating simulated fingerprint images respectively corresponding to the P similarities based on the reference fingerprint image and the difference statistical parameters respectively corresponding to the P similarities.

According to some example embodiments, the generating of the N approximate images according to the N target similarities based on each of the M sample fingerprint images includes: obtaining the N approximate images corresponding to the M sample fingerprint images by performing iterative calculations using an evolutionary algorithm, by respectively taking each of the M sample fingerprint images as a reference, wherein each of the N approximate images corresponds to one iteration; and wherein each one of the N target similarities is represented by a number of iterations of the respective one of the N approximate images corresponding to an associated one of the M difference parameters.

According to some example embodiments, in the evolutionary algorithm, a structural similarity between a plurality of candidate images generated in each iteration and the reference is a fitness value of a corresponding candidate image of the plurality of candidate images, and the respective one of the N approximate images in a corresponding iteration is selected from the plurality of candidate images according to the fitness value.

According to some example embodiments, the evolutionary algorithm includes a genetic algorithm.

According to some example embodiments, the analyzing the difference between each of the M sample fingerprint images and the respective one of the N approximate images, to obtain the (M×N) difference parameters, includes: respectively taking each of the M sample fingerprint images and the respective one of the N approximate images as one image pair, to form (M×N) image pairs; calculating differences in pixel values for each one of the (M×N) image pairs at corresponding pixel points as difference values; and with respect to each one of the (M×N) image pairs, analyzing a distribution rule of the difference values on each pixel point, and obtaining a parameter describing the distribution rule as a (M×N) difference parameter of the respective one of the (M×N) image pairs to obtain the (M×N) difference parameters.

According to some example embodiments, with respect to each one of the (M×N) image pairs, the analyzing the distribution rule of the difference values on each pixel point, and the obtaining the parameter describing the distribution rule as the (M×N) difference parameter, include: with respect to each one of the (M×N) image pairs, performing frequency statistical analysis on the difference values at each pixel point, and obtaining probability distribution parameters as the (M×N) difference parameters of the respective one of the (M×N) image pairs by a fitting operation to obtain the (M×N) difference parameters.

According to some example embodiments, the probability distribution parameters include normal distribution parameters.

According to some example embodiments, the fingerprint image generating method further includes: respectively statistically calculating the M difference parameters respectively associated with the N target similarities to obtain the difference statistical parameters of the N target similarities; obtaining a plurality of verified fingerprint images; with respect to each of the plurality of verified fingerprint images, generating simulated fingerprint images respectively corresponding to the N target similarities according to the verified fingerprint images and the difference statistical parameters respectively corresponding to the N target similarities; determining liveness scores of the simulated fingerprint images respectively corresponding to the N target similarities; and selecting the P similarities from the N target similarities according to the liveness scores and a screening condition.

According to some example embodiments, P is greater than 1, and the P similarities are a continuous interval in a similarity interval composed of the N target similarities; and the screening condition includes, with respect to at least some verified fingerprint images, the liveness scores of the simulated fingerprint images corresponding to the P similarities continuously distributed over a liveness score interval.

According to some example embodiments, there is provided a fingerprint image generating device, including: processing circuitry, the processing circuitry configured to obtain M sample fingerprint images; generate N approximate images according to N target similarities based on each of the M sample fingerprint images, each of the N target similarities being a similarity value between a respective one of the N approximate images and a respective one of the M sample fingerprint images on which the respective one of the N approximate images is based, M and N being integers greater than 1; analyze a difference between each one of the M sample fingerprint images and the respective one of the N approximate images, to obtain (M×N) difference parameters, each one of the (M×N) difference parameters quantifying a difference between each one of the respective M sample fingerprint images and the respective N approximate images, each one of the (M×N) difference parameters being associated with the similarity value between the respective one of the M sample fingerprint images and the respective one of the N approximate images, such that each of the N target similarities is associated with M difference parameters; statistically calculate the M difference parameters respectively associated with P similarities among the N target similarities respectively to obtain difference statistical parameters respectively corresponding to the P similarities, P being an integer greater than or equal to 1; obtain a reference fingerprint image; and generate simulated fingerprint images respectively corresponding to the P similarities based on the reference fingerprint image and the difference statistical parameters respectively corresponding to the P similarities.

According to some example embodiments, the processing circuitry is configured to: obtain the N approximate images corresponding to the M sample fingerprint images by performing iterative calculations using an evolutionary algorithm, by respectively taking each of the M sample fingerprint images as a reference, wherein each of the N approximate images corresponds to one iteration; and wherein each one of the N target similarities is represented by a number of iterations of the respective one of the N approximate images corresponding to an associated one of the M difference parameters.

According to some example embodiments, in the evolutionary algorithm, a structural similarity between a plurality of candidate images generated in each iteration and the reference is a fitness value of a corresponding candidate image of the plurality of candidate images, and the respective one of the N approximate images in a corresponding iteration is selected from the plurality of candidate images according to the fitness value.

According to some example embodiments, the evolutionary algorithm includes a genetic algorithm.

According to some example embodiments, the processing circuitry is configured to: respectively take each of the M sample fingerprint images and the respective one of the N approximate images as one image pair, to form (M×N) image pairs; calculate differences in pixel values for each one of the (M×N) image pairs at corresponding pixel points as difference values; and with respect to each one of the (M×N) image pairs, analyze a distribution rule of the difference values on each pixel point, and obtain a parameter describing the distribution rule as a (M×N) difference parameter of the respective one of the (M×N) image pairs to obtain the (M×N) difference parameters.

According to some example embodiments, the processing circuitry is configured to: with respect to each one of the (M×N) image pairs, perform frequency statistical analysis on the difference values at each pixel point, and obtain probability distribution parameters as the (M×N) difference parameter of the respective one of the (M×N) image pairs by a fitting operation to obtain the (M×N) difference parameters.

According to some example embodiments, the probability distribution parameters comprise normal distribution parameters.

According to some example embodiments, the processing circuitry is configured to: respectively statistically calculate the M difference parameters respectively associated with the N target similarities to obtain the difference statistical parameters of the N target similarities; obtain a plurality of verified fingerprint images; generate simulated fingerprint images respectively corresponding to the N target similarities according to the verified fingerprint images and the difference statistical parameters respectively corresponding to the N target similarities, with respect to each of the plurality of verified fingerprint images; determine liveness scores of the simulated fingerprint images respectively corresponding to the N target similarities; and select the P similarities from the N target similarities according to the liveness scores and a screening condition.

According to some example embodiments, P is greater than 1, and the P similarities are a continuous interval in a similarity interval composed of the N target similarities; and the screening condition includes, with respect to at least some verified fingerprint images, the liveness scores of the simulated fingerprint images corresponding to the P similarities continuously distributed over a liveness score interval.

According to some example embodiments, there is provided a non-transitory computer readable storage medium storing a computer program, wherein the computer program, when executed by a processor, is configured to implement the fingerprint image generating method according to some example embodiments.

According to some example embodiments, there is provided a computing device, including: at least one processor; and at least one memory configured to store a computer program, the computer program, when executed by the at least one processor, is configured to obtain M sample fingerprint images; generate N approximate images according to N target similarities based on each of the M sample fingerprint images, each of the N target similarities being a similarity value between a respective one of the N approximate images and a respective one of the M sample fingerprint images on which the respective one of the N approximate images is based, M and N being integers greater than 1; analyze a difference between each one of the M sample fingerprint images and the respective one of the N approximate images, to obtain (M×N) difference parameters, each one of the (M×N) difference parameters quantifying a difference between each one of the respective M sample fingerprint images and the respective N approximate images, each one of the (M×N) difference parameters being associated with the similarity value between the respective one of the M sample fingerprint images and the respective one of the N approximate images, such that each of the N target similarities is associated with M difference parameters; statistically calculate the M difference parameters respectively associated with P similarities among the N target similarities respectively, to obtain difference statistical parameters respectively corresponding to P similarities, P being an integer greater than or equal to 1; obtain a reference fingerprint image; and generate simulated fingerprint images respectively corresponding to the P similarities based on the reference fingerprint image and the difference statistical parameters respectively corresponding to the P similarities.

According to some example embodiments, there is provided a computer program product comprising instructions, wherein the instructions, when executed by a processor of a computer apparatus, are configured to implement the fingerprint image generating method according to some example embodiments.

The fingerprint image generating methods and devices according to some example embodiments of the present inventive concepts find that the similarity between the sample fingerprint image used as the reference and its approximate image is significantly correlated with the liveness score of the approximate image, after preliminary analysis. Based on this, the approximate images with the same target similarity are generated for a plurality of sample fingerprint images, and the differences between each approximate image and the corresponding sample fingerprint image are statistically calculated to obtain the difference statistical parameter. The difference statistical parameter can be used to represent the difference between any reference image and its approximate image under the target similarity. Meanwhile, the target similarity and the liveness score of the approximate image show a significant correlation, which means that the difference statistical parameter can represent the difference between any reference image and its approximate image under the relevant liveness score.

On this basis, according to some example embodiments, with respect to the reference fingerprint image, a new fingerprint image is generated by combining with the difference statistical parameter corresponding to the specified similarity, and denoted as the simulated fingerprint image, which can have the liveness score related to the specified similarity. Since this method according to some example embodiments of the present inventive concepts can obtain the difference statistical parameters corresponding to the different target similarities (or the different liveness scores) using a small number of sample fingerprint images, and can directly reuse these difference statistical parameters to quickly generate the simulated fingerprint images with the required liveness scores based on any reference fingerprint image, it can achieve fast and low-cost acquisition of the simulated fingerprint images with different liveness scores.

Other aspects and/or advantages of the present inventive concepts will be partially illustrated in the subsequent depictions, and the other part will become clear through the depiction or may be learned through the implementation of the general concept of the present inventive concepts.

BRIEF DESCRIPTION OF THE DRAWINGS

The above and other objects and features of the exemplary embodiments of the present inventive concepts will become clear through the following description taken in conjunction with the accompanying drawings exemplarily illustrating some example embodiments in which.

DETAILED DESCRIPTION

Figure 1:
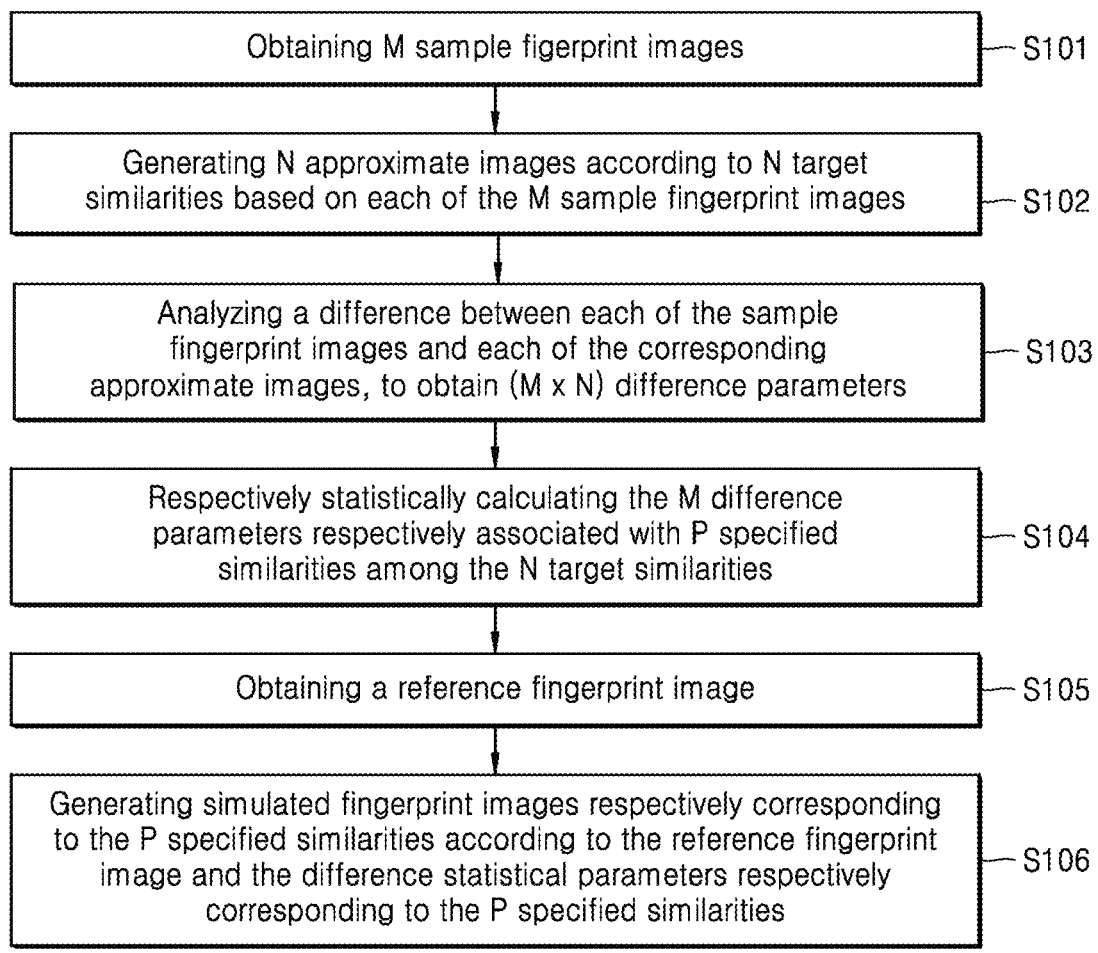
FIG. 1 illustrates a flowchart of a fingerprint image generating method according to some example embodiments.

Reference will now be made in detail to some example embodiments of the present inventive concepts, and examples of the example embodiments are illustrated in the accompanying drawings, wherein same reference numerals refer to same parts throughout. The example embodiments will be illustrated below, by referring to the accompanying drawings, so as to explain the present inventive concepts.

FIG. 1 illustrates a flowchart of a fingerprint image generating method according to some example embodiments.

The fingerprint image generation method consists of at least two stages. Referring to FIG. 1, operations S101 to S104 represent a preliminary data preparing stage used to prepare difference statistical parameters corresponding to different specified or alternatively, desired similarities. Operations S105 and S106 represent a formal fingerprint generating stage used to generate simulated fingerprint images based on reference fingerprint images and the previously prepared difference statistical parameters.

The data preparing stage according to some example embodiments may include: In operation S101, M sample fingerprint images are obtained.

The M sample fingerprint images obtained in operation S101 may serve as reference data for the preliminary data preparing operation according to some example embodiments. M may be an integer greater than 1, which means it may not be advisable to use only one sample fingerprint image, so the universality of the difference statistical parameters obtained later according to some example embodiments of the present inventive concepts can be improved.

In operation S102, N approximate images are generated according to N target similarities based on each of the M sample fingerprint images.

The target similarity, according to some example embodiments, may be a similarity between the approximate image and the sample fingerprint image on which the approximate image is based, for example, Structure Similarity (SSIM), Peak Signal to Noise Ratio (PSNR), and Mean Squared Error (MSE) can be used. For example, in some example embodiments, Structure Similarity (SSIM), Peak Signal to Noise Ratio (PSNR), and Mean Squared Error (MSE) may be utilized to define a target similarity value between an approximate image and a sample fingerprint image on which an approximate image is based, but example embodiments are not limited thereto. It should be understood that the term "target" herein denotes that a value of the similarity is a target value, rather than denoting a target form of similarity. In the same way, a specified similarity in the following text denotes that the value of the similarity is a specified, or alternatively desired value.

After a preliminary analysis, it was found that there is a clear correlation between the similarity and a liveness score of a corresponding approximate image, and thus different or varying sizes of similarities can be used to correspond to different sizes of liveness scores. According to some example embodiments, N may also be an integer greater than 1, so that a plurality of similarities can be obtained to correspond to a plurality of liveness scores.

It should be noted that, after the preliminary analysis, it was found that the same similarity corresponding to the liveness score does not means that the similarity corresponds to one precise liveness score value, but corresponds to one liveness score interval, which has a certain range of error. However, this liveness score interval is sufficient to meet practical application needs. Specifically, in the practical application, taking the range of liveness scores as [0, 100] as an example, a liveness score larger than 80 is, or maybe, considered as a true fingerprint.

In operation S103, a difference between each of the sample fingerprint images and each of the corresponding generated approximate images is analyzed to obtain (M×N) difference parameters.

According to some example embodiments, each difference parameter is, or may be used to quantify a difference between one sample fingerprint image and one approximate image, resulting in a total of (M×N) difference parameters (M is a number of the sample fingerprint images, and N is a number of the approximate images generated for each sample fingerprint image). The difference parameter is associated with the similarity between the represented sample fingerprint image and the approximate image, so that each of N target similarities is in turn associated with M difference parameters (corresponding to the M sample fingerprint images).

In operation S104, the M difference parameters respectively associated with P specified similarities among the N target similarities are respectively statistically calculated, so as to obtain the difference statistical parameters respectively corresponding to the P specified similarities.

According to some example embodiments, the specified similarity is a similarity determined from the N target similarities, which is used for the subsequent formal fingerprint generation. P is an integer greater than or equal to 1 and less than or equal to N, so that 1 to N different simulated fingerprint images can be generated based on a same reference fingerprint image.

It should be understood that this operation emphasizes that the difference statistical parameters respectively corresponding to the P specified similarities are required or advantageous to be obtained with respect to a requirement for the fingerprint generation in subsequent operation S106, but it does not necessarily mean that only the difference statistical parameters of these P specified similarities can be obtained. For example, when the number of specified similarities P is less than the number of target similarities N (P<N), the difference statistical parameters corresponding to the target similarities other than the P specified similarities required in operation S106 among the N target similarities can also be obtained in this operation, S104.

The fingerprint generating stage according to some example embodiments may include:

In operation S105, a reference fingerprint image is obtained.

According to some example embodiments, as a reference for generating new fingerprint images, a number of the reference fingerprint images may be at least one, but example embodiments are not limited thereto, and for example, and the number of reference fingerprint images generated can be increased as needed, or alternatively desired without specific restrictions.

In operation S106, simulated fingerprint images respectively corresponding to the P specified similarities are generated according to the reference fingerprint image and the difference statistical parameters respectively corresponding to the P specified similarities.

Referring back to operations S103 and S104, it can be seen that the difference statistical parameter is a statistic of the difference parameters and can be regarded as a representative of the difference parameters. Following the path of obtaining the difference parameter from the difference in operation S103, in some example embodiments, a reverse calculation can be performed to obtain the difference corresponding to the difference statistical parameter. Then, this difference may be superimposed on the reference fingerprint image to obtain the simulated fingerprint image.

The fingerprint image generating method according to some example embodiments can obtain the difference statistical parameters corresponding to the different target similarities (or the different liveness scores) using a small number of sample fingerprint images in the preliminary data preparing stage, and can directly reuse those statistical parameters to quickly generate the simulated fingerprint images with the required, or alternatively desired liveness scores based on any reference fingerprint image in the formal fingerprint generating stage, such that the fingerprint image generating method can achieve fast acquisition of the simulated fingerprint images with the different liveness scores at low cost.

It should be noted that, in some example embodiments, both the sample fingerprint image and the reference fingerprint image are fake fingerprint images, thus achieving the generation of a plurality of fake fingerprints with the different liveness scores based on one existing fake fingerprint.

Next, the fingerprint image generating method according to some example embodiments of the present inventive concepts will be further described.

In some example embodiments, with respect to the generation of the approximate image, operation S102 may include: obtaining the N approximate images corresponding to the sample fingerprint image by performing iterative calculation using an evolutionary algorithm, by respectively taking each of the M sample fingerprint images as a reference, wherein each of the N approximate images corresponds to one iteration; and wherein the target similarity is represented by a number of iterations of the approximate image corresponding to the associated difference parameter. In some example embodiments, by performing the iterative calculation using the evolutionary algorithm, the iteration result is taken as one approximate image in each iteration, so that the approximate image gradually approaches the sample fingerprint image being the reference as the iteration progresses by utilizing a property of the evolutionary algorithm itself, e.g., the similarity gradually increases, thereby achieving convenient and reliable approximate image generation. At this point, each iterative calculation can be regarded as corresponding to one target similarity, and thus a number of iterations of the approximate image is used to represent the target similarity, so that there is a unified standard that is simple and easy to implement for generating the approximate image based on the different sample fingerprint images respectively.

According to some example embodiments, in the evolutionary algorithm, a structural similarity between a plurality of candidate images generated in each iteration and the sample fingerprint image as the reference is used as a fitness of the corresponding candidate image, and the approximate image in the corresponding iteration is selected from the plurality of candidate images according to the fitness. In some example embodiments, a fitness may refer to a fitness measurement or value. According to some example embodiments, using the structural similarity as the similarity can improve the quality of the finally generated simulated fingerprint image after verification. According to some example embodiments, the evolutionary algorithm can be combined with the similarity, and the similarity can be used as a screening condition in the evolutionary algorithm, thereby fully ensuring that the similarity gradually increases as the iteration progresses.

As an example, the selecting of the approximate image in the corresponding iteration from the plurality of candidate images according to the fitness includes: selecting a candidate image with the highest fitness from the plurality of candidate images as the approximate image in the corresponding iteration; or determining the target similarity corresponding to a current iteration according to a preconfigured target similarity corresponding to each iteration, and selecting a candidate image with the fitness closest to the target similarity from the plurality of candidate images as the approximate image in the corresponding iteration.

In some example embodiments of the present inventive concepts, the evolutionary algorithm includes a genetic algorithm (GA), which can improve the quality of the finally generated simulated fingerprint image after verification. In some example embodiments, other evolutionary algorithms can also be used, such as a Particle Swarm Optimization (PSO) algorithm, an Ant Colony Optimization (ACO) algorithm, a Differential Evolution (DE) algorithm, etc., but example embodiments of the present inventive concepts are not limited thereto.

It should be understood that, according to some example embodiments, in addition to using the evolutionary algorithm for performing the iterative calculation, other methods can also be used to generate the approximate images, and the present inventive concepts are not limited thereto.

Figure 2:
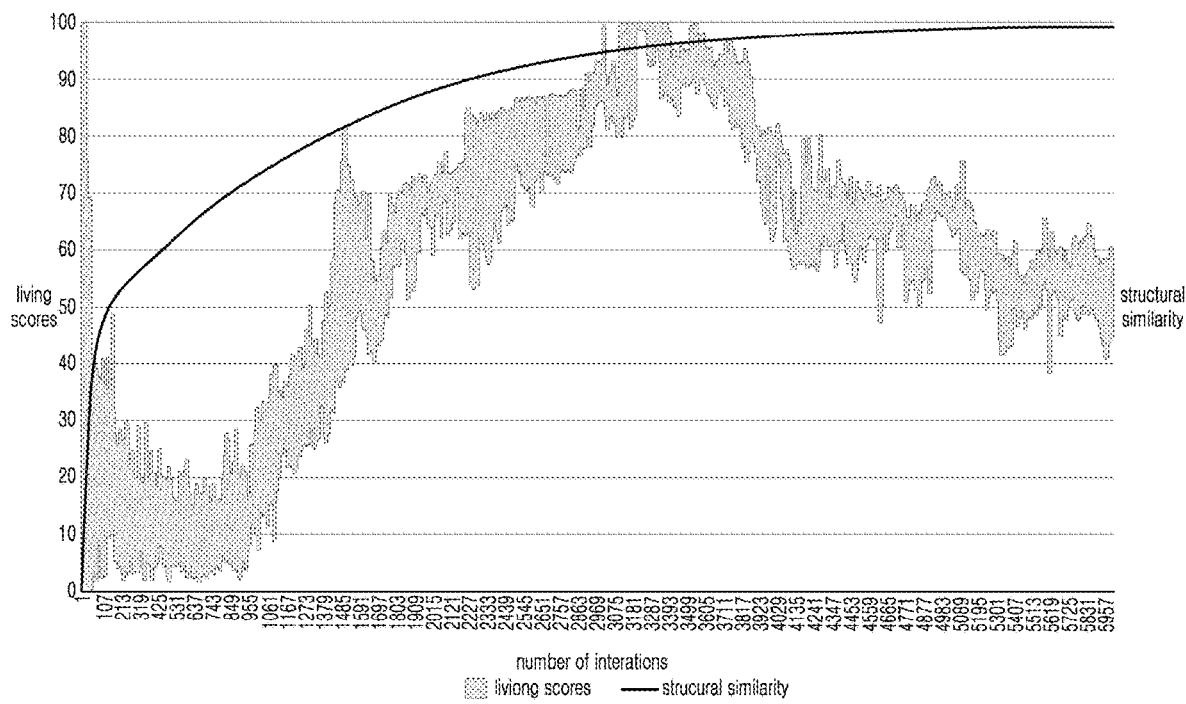
FIG. 2 illustrates a trend diagram that a similarity and a liveness score change with iterations during an approximate image generation process according to some example embodiments.

FIG. 2 illustrates a trend diagram that a similarity and a liveness score change with iterations during an approximate image generation process according some example embodiments, which is obtained by calculating and analyzing a plurality of sample fingerprint images. Referring to FIG. 2, the horizontal axis represents a number of iterations (e.g., 1 to 5937), the vertical axis on the left represents the liveness score (e.g., a liveness score between 1 to 100), and the vertical axis on the right represents a structural similarity (as a similarity). According to some example embodiments, as the iteration progresses, the similarity gradually increases, and each iteration corresponds to a smaller interval of liveness scores. In some example embodiments, the liveness score first fluctuates significantly as a whole, then presents a gradually increasing trend, and then decreases. For example, as illustrated in FIG. 2, the change trends of the liveness score and the similarity are not always consistent. Based on change trends of the liveness score and the similarity, a portion of the total target similarity can be selected as a specified, or alternatively desired similarity.

Regarding the determination of the specified similarity, in some example embodiments, the fingerprint image generating method according to some example embodiments may further include: respectively statistically calculating M difference parameters respectively associated with N target similarities, so as to obtain difference statistical parameters of the N target similarities; obtaining a plurality of verified fingerprint images, with respect to each of the plurality of verified fingerprint images, generating simulated fingerprint images respectively corresponding to the N target similarities according to the verified fingerprint images and the difference statistical parameters respectively corresponding to the N target similarities; determining liveness scores of the simulated fingerprint images respectively corresponding to the N target similarities; and selecting P specified similarities from the N target similarities according to the liveness scores and a preset screening condition. According to some example embodiments, by using the plurality of verified fingerprint images for trial generation of the simulated fingerprint images, for example, generating a plurality of the corresponding simulated fingerprint images and analyzing the liveness scores of the generated simulated fingerprint images according to operation S106, illustrated in FIG. 1, in the fingerprint generating stage based on the plurality of verified fingerprint images and other prepared difference statistical parameters, wherein whether the liveness scores satisfy practical application needs can be known, and the P specified similarities satisfying the needs (e.g., satisfying the preset screening condition) can be selected in conjunction with the preset screening condition, which helps to ensure that the simulated fingerprint images generated in the formal fingerprint generating stage satisfy the practical application needs.

It should be understood that, in order to satisfy the practical application needs, a larger range of values can be determined for the target similarity first. According to some example embodiments, if the simulated fingerprint images are directly generated based on all target similarities, the practical application needs can be theoretically satisfied, but there are drawbacks such as a high computation amount and ineffective calculations. By combining with the preset screening condition according to some example embodiments, the P specified similarities can be selected from the N target similarities, which can further reduce the computation amount and improve an efficiency of generating the simulated fingerprint images. In some example embodiments, if a large number of the simulated fingerprint images need to be generated or if it would be advantageous to generate a larger number of simulated fingerprint images, the difference statistical parameters corresponding to the target similarities other than the specified similarities can also be used, and the present inventive concepts are not limited thereto.

In some example embodiments, P specified similarities is greater than 1, and the P specified similarities are a continuous interval in a similarity interval composed of the N target similarities, so that a large number of the simulated fingerprint images can be generated. According to some example embodiments, the preset screening condition may include, with respect to at least some verified fingerprint images, the liveness scores of the simulated fingerprint images corresponding to the P specified similarities are continuously distributed and cover a specified, or alternatively desired liveness score interval. In some example embodiments, for the same verified fingerprint image, by requiring the liveness scores of the simulated fingerprint images to be continuously distributed and to cover the specified liveness score interval, it helps to ensure that the liveness scores of subsequent formally generated simulated fingerprint images continuously cover the specified liveness score interval, thus satisfying the practical application needs. For example, in some example embodiments, for the same verified fingerprint image, when the liveness scores of the simulated fingerprint images are continuously distributed and cover the specified, or alternatively desired liveness score interval, the liveness scores of subsequent formally generated simulated images continuously covering the specified, or alternatively desired liveness score interval may be ensured, and thus, in some example embodiments, the practical application needs may be satisfied. For example, the specified liveness score interval may be the entire value range of the liveness scores, so as to achieve a full coverage. Depending on the different value standards of the liveness scores, the specified liveness score interval may be [0, 1], or [0, 100] for example. Accordingly, in some example embodiments, by requiring, or conditioning, at least some verified fingerprint images to satisfy the aforementioned requirements, rather than all the verified fingerprint images satisfying the aforementioned requirements, a certain, or alternatively desired error can be allowed to exist, in order to enhance applicability of the present inventive concepts. For example, a preset ratio of verified fingerprint images satisfying the aforementioned requirements can be configured, and as long as a ratio of the verified fingerprint images satisfying the aforementioned requirements reaches the preset ratio, the preset screening condition may be considered as satisfied.

In some example embodiments, with respect to the analysis of the difference parameters, operation S103, illustrated in FIG. 1, may include: taking (e.g., receiving, obtaining, etc.) one sample fingerprint image and one corresponding generated approximate image as one image pair, so as to form (M×N) image pairs; calculating differences in pixel values for each image pair at the corresponding pixel points as difference values, so as to obtain a set consisting of difference values on each pixel point in each image pair, wherein there are a large number of pixel points on each image; analyzing, with respect to each image pair, a distribution rule of the difference values on each pixel point; and obtaining a parameter describing the distribution rule as the difference parameter of the image pair, so as to obtain (M×N) difference parameters. Accordingly, in some example embodiments, by using the parameter describing the distribution rule of the difference values as the difference parameter, it is possible to concisely describe a large number of difference values in each image pair.

In some example embodiments, in the operation of analyzing, with respect to each image pair, the distribution rule of the difference values on each pixel point, and obtaining the parameter describing the distribution rule as the difference parameter of the image pair, so as to obtain (M×N) difference parameters in operation S103, may include: performing, with respect to each image pair, frequency statistical analysis on the difference values at each pixel point, and obtaining probability distribution parameters as the difference parameters of the image pair by a fitting operation, so as to obtain the (M×N) difference parameters. In some example embodiments, after verification, when performing the frequency statistical analysis, a relatively stable distribution rule can be obtained, and as the target similarity increases, the distribution of the difference values presents a gradually concentrated trend. This universal rule is more conducive to promoting to other images, so that it is more likely that the liveness score of the simulated fingerprint image generated based on an arbitrary reference fingerprint image satisfies expectations, thereby improving the quality of the generated simulated fingerprint image.

In some example embodiments, the probability distribution parameters may include normal distribution parameters, e.g., the expectation μ and the standard deviation σ. By performing a normal distribution fitting on the difference value at each pixel point in the image pair, highly representative difference parameters can be obtained, which help to improve the quality of the generated simulated fingerprint images.

Next, an example embodiment will be used to describe the fingerprint image generating method according to some example embodiments of the present inventive concepts.

Figure 3:
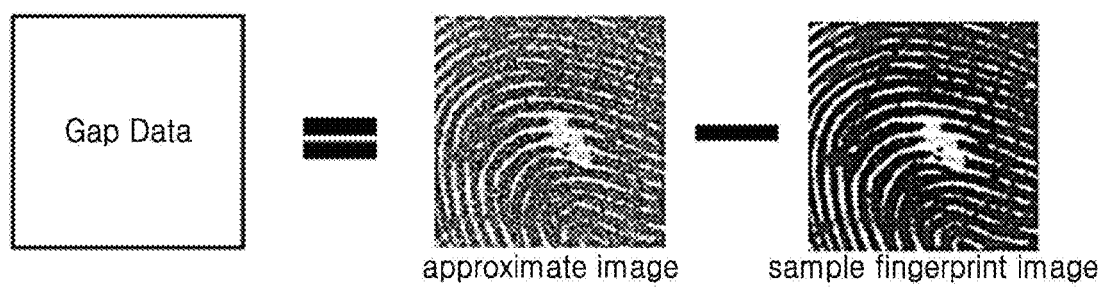
FIG. 3 illustrates a schematic principle diagram of difference data according to some example embodiments.

In this example embodiment, the fingerprint generating method can generate corresponding simulated fingerprint images according to the specified, or alternatively desired liveness score, which is used to solve the problems of high cost of collecting fingerprint images for PAI materials and inability to cover all liveness score ranges of fingerprint images. For example, as illustrated in FIG. 3, this method generates new simulated fingerprint images, based on analyzing Gap Data (the difference data, referring to FIG. 3) between approximate images (generated by traditional iterative methods) and sample fingerprint images being the reference, and modeling the Gap Data. This method requires less data in the data preparing stage, and a speed of generating the simulated fingerprint images in the later stage is fast. The generated simulated fingerprint images can cover the liveness scores in the entire domain (such as [0, 1], [0, 100]), and this method has a universal applicability.

Figure 4:
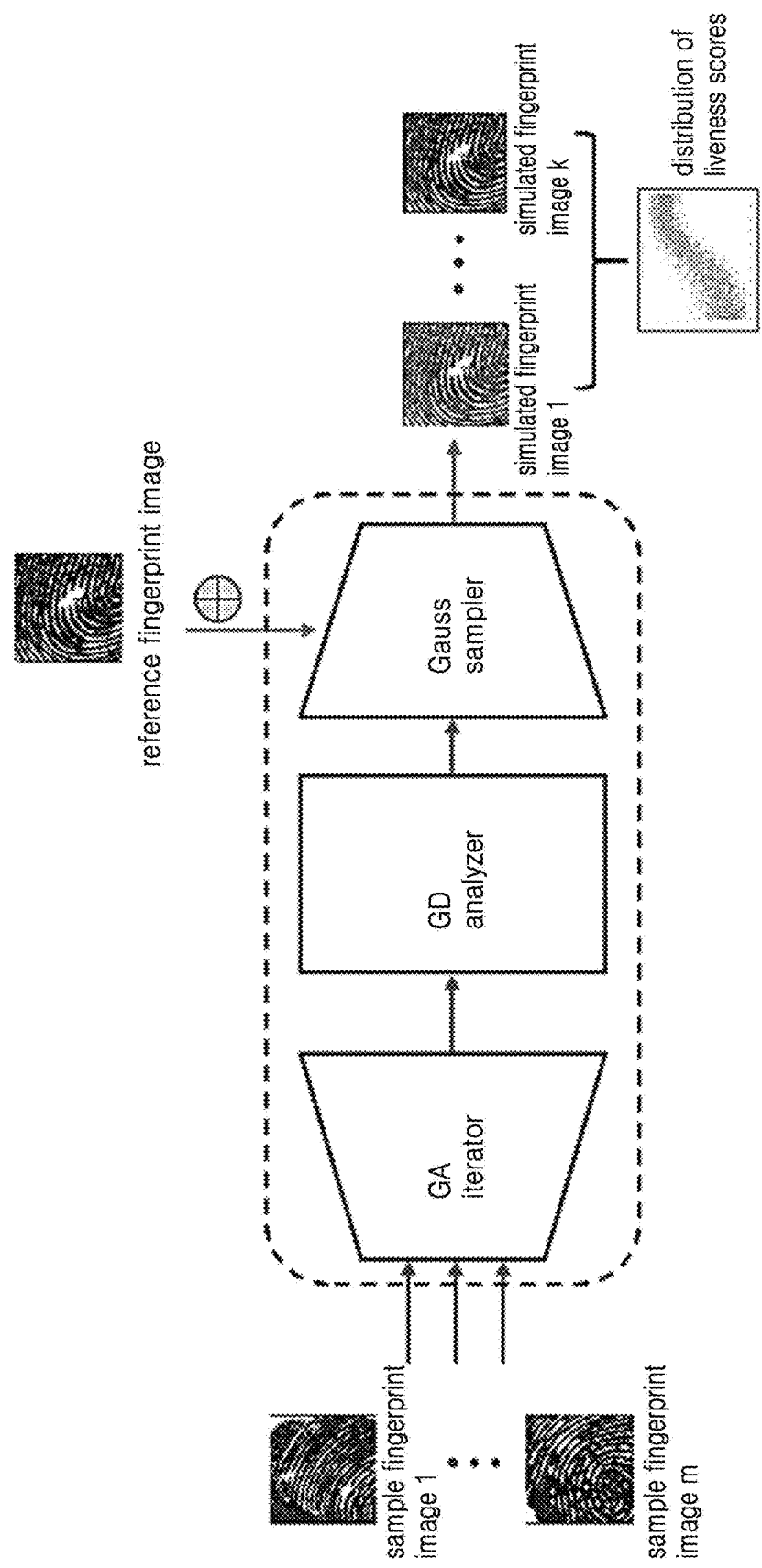
FIG. 4 illustrates a structural diagram of a fingerprint image generating method according to some example embodiments.

FIG. 4 illustrates a structural diagram of a fingerprint image generating method according to some example embodiments.

Referring to FIG. 4, the entire method may consist of, but is not limited to, the following three main modules.

1. A Genetic Algorithm (GA) iterator. The Genetic Algorithm (GA) iterator may be used to construct a group of approximate images which take Structure Similarity (SSIM) as an iteration index. For example, through iteration, an approximate image can be generated, and a similarity between the approximate image and a sample fingerprint image as reference under the SSIM index gradually increases. The larger the SSIM, the higher the similarity between the generated approximate image and the sample fingerprint image as the reference, and thus more fingerprint detail information is retained. According to some example embodiments, a liveness score of the generated approximate image will also exhibit a certain variation rule with the change of SSIM value, as shown in, for example, FIG. 2.

Figure 5:
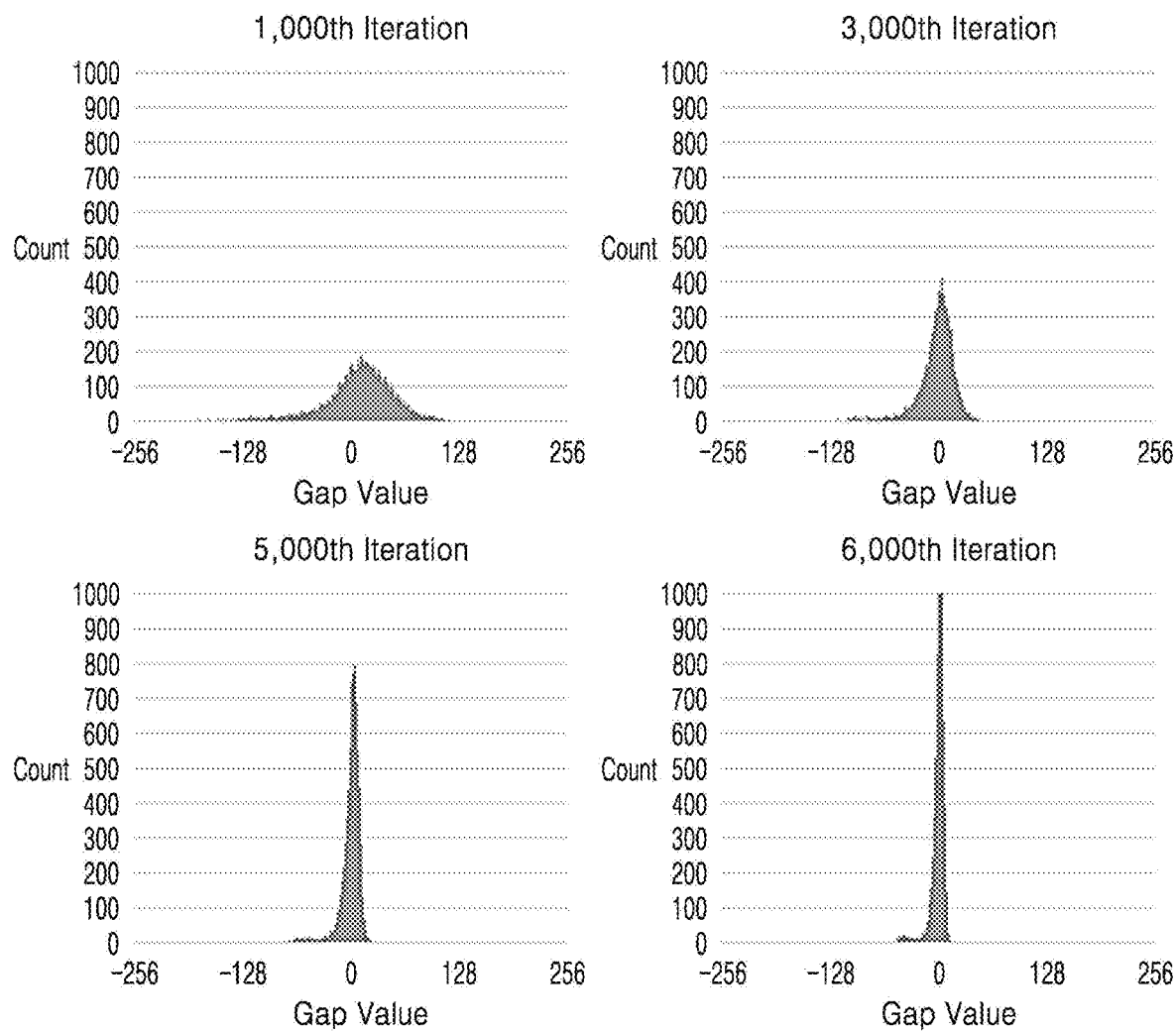
FIG. 5 illustrates a schematic diagram of a statistical distribution of difference data according to some example embodiments.

2. A Gap Data (GD) analyzer. The GD (Gap Data, e.g., difference data) analyzer may be used to analyze differences in pixel values at corresponding pixel points between the approximate image generated in each iteration and the sample fingerprint image as the reference. For example, a frequency statistical analysis of pixel value is performed to confirm whether the GD conforms to a Gaussian distribution and further fit the corresponding parameters $\mu$ and $\sigma$ of the Gaussian distribution (as a difference parameter), as shown in FIG. 5. Each approximate image and its corresponding sample fingerprint image can fit a Gaussian distribution to obtain a set of Gaussian distribution parameters. A plurality of sets of Gaussian distribution parameters corresponding to a plurality of sample fingerprint images can be obtained in each iteration. In other words, in some example embodiments, for each iteration, a number of the groups of the Gaussian distribution parameters obtained is equal to a number of the used sample fingerprint images. In some example embodiments, a GD analysis can confirm a degree of influence of different GD on the liveness score of the approximate image.

3. A Gauss sampler. The Gauss sampler may take averages of Gaussian distribution parameters $\mu$ and $\sigma$ of a specified number of iterations within a specified, or alternatively desired interval of a number of iterations [Iteration_start, Iteration_end] as new Gaussian sampling parameters $\bar{\mu}$ and $\bar{\sigma}$, and may perform a sampling based on reference fingerprint images, so as to generate simulated fingerprint images.

According to some example embodiments, the GA iterator, GD analyzer, and Gauss sampler may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and a programmable logic unit, a microprocessor, application-specific integrated circuit (ASIC), a neural network processing unit (NPU), an Electronic Control Unit (ECU), an Image signal Processor (ISP), and the like. In some example embodiments, the processing circuitry may include a non-transitory computer readable storage device (e.g., a memory), for example a solid state drive (SSD), storing a program of instructions, and a processor (e.g., a CPU) configured to execute the program of instructions to implement the functionality and/or methods performed by the GA iterator, GD analyzer, and Gauss sampler.

According to some example embodiments, since the GD conforms to the Gaussian distribution approximately, the Gaussian sampler can generate simulated data GDi for GD (i representing a number of iterations), e.g., the averages $\bar{\mu}$ and $\bar{\sigma}$ of the Gaussian distribution parameters of the specified, or alternatively desired number of iterations as described above. It can be seen from the analysis result of the GD that new images with different liveness scores may be obtained by superimposing different GDs on the fingerprint image as the reference. Therefore, in some example embodiments, a new image with the changed liveness score can be generated by superimposing the corresponding GDi generated by the Gauss sampler on the fingerprint image as the reference. For example, a difference data sequence can be generated based on the simulated data GDi, and each difference data in the difference data sequence can be randomly assigned to different pixel points in the reference fingerprint image, so that the obtained new image is the simulated fingerprint image.

Figure 6:
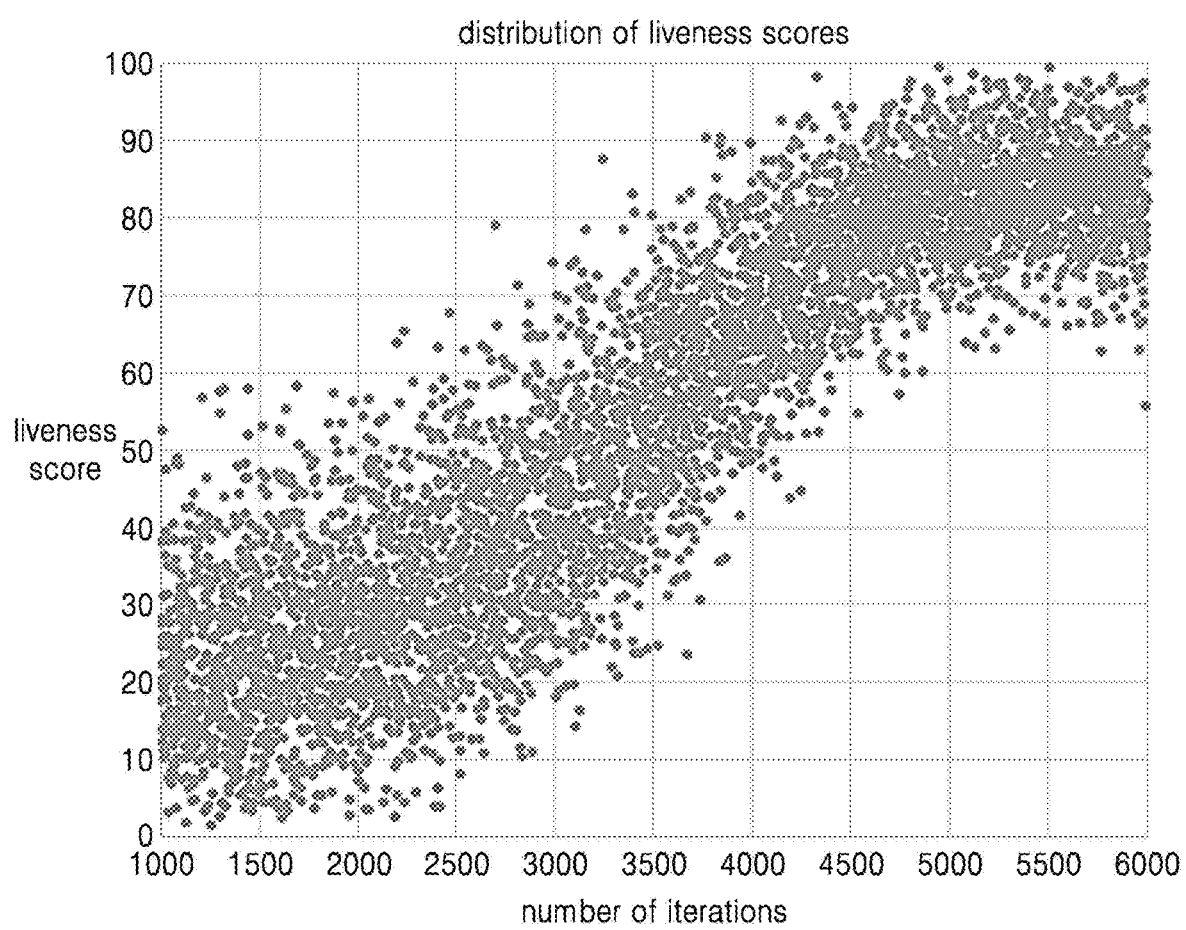
FIG. 6 illustrates a schematic diagram of a distribution of liveness scores of simulated fingerprint images generated by a Gauss sampler according to some example embodiments.

According to some example embodiments, the specified, or alternatively desired interval of a number of iterations can be determined as follows: applying the simulated data GDi of the GD corresponding to a larger iteration interval to a plurality of verified fingerprint images, generating a set of simulated fingerprint images for respective verified fingerprint image, analyzing a change rule of the liveness scores of each set of simulated fingerprint images, and finding the iteration interval where the liveness scores gradually increases and covers the entire domain of the liveness scores as the specified, or alternatively desired interval of the number of iterations. As such, in some example embodiments, the liveness scores of the generated simulated fingerprint images are covered within a range of [0 to 1] or [0 to 100]. At the formal fingerprint generating stage, the Gauss sampler may enable a distribution pattern of the liveness scores of the simulated fingerprint images generated by simulated sampling to be consistent with a trend of a pattern of the GA iterations within the range of the specified, or alternatively desired interval of the number of iterations based on the GD corresponding to the GA iteration data, as shown in FIG. 6. It should be noted that one can observe, by comparing FIG. 2 and FIG. 6, that they are not completely consistent in terms of the number of iterations. This is because there is a hysteresis in FIG. 6, and different fingerprint images generally conform to the rule in FIG. 6 when generating the new images. Therefore, according to some example embodiments, the simulated data GDi of the GD has a general law and can be used to generate the simulated fingerprint images based on other existing fingerprint images (e.g., the reference fingerprint images).

In some example embodiments, since a set of parameters ($\mu$, $\sigma$) can represent a Gaussian distribution, a function relationship $f(\mu, \sigma)$=Liveness Score can be further established, so that the difference parameters and the liveness scores can be more accurately associated with each other, and a general law of the function relationship in the different images is analyzed.

Figure 7:
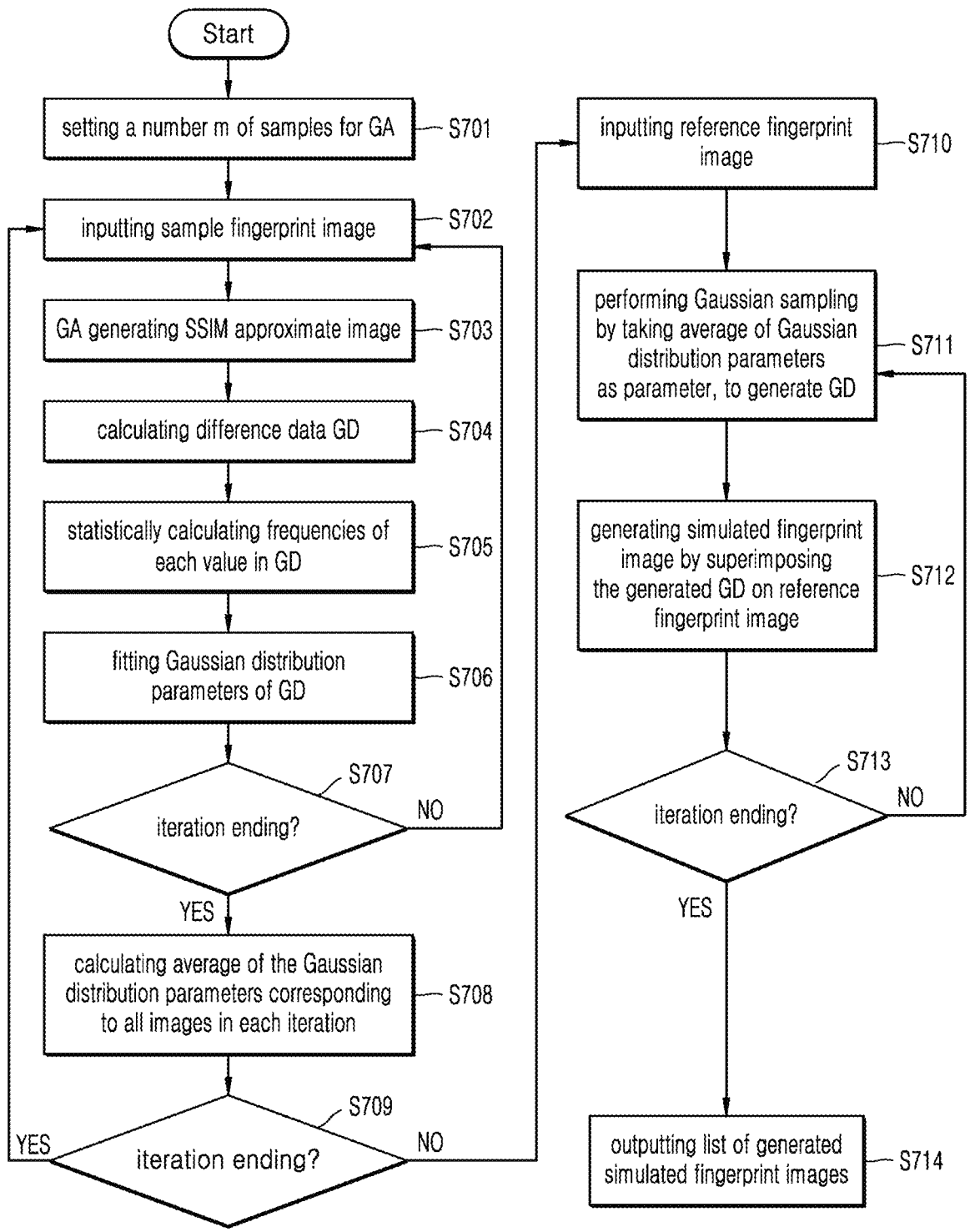
FIG. 7 illustrates a schematic flowchart of a fingerprint image generating method according to some example embodiments.

FIG. 7 illustrates a schematic flowchart of a fingerprint image generating method according to some example embodiments.

Referring to FIG. 7, the fingerprint image generating method, according to some example embodiments, may include a data preparing stage (e.g., a data preparing operation, S701-S709) on the left and a fingerprint generating stage (e.g., a fingerprint generating operation, S710-S714) on the right, and, in some example embodiments, may ignore an operation of determining a specified, or alternatively desired interval of a number of iterations. The method according to some example embodiments, may directly perform iterative calculation of all iterations for the data preparing stage, and generate a corresponding simulated fingerprint image by using an average of corresponding Gaussian distribution parameters.

At the data preparing stage, in operation S701, a number m of sample fingerprint images on which GA iterations are required, or advantageous, to be performed and a number k of GA iterations are first set.

Next, in operation S702, a sample fingerprint image $Image^i$ is input that is ready for the GA iterations (the superscript i indicates a serial number of the sample fingerprint image). With respect to the image, in operation S703, an approximate image $Image_{iter}^i$ is generated (the subscript iter indicates a number of iterations) by using SSIM as a GA iteration index. In operation S704, a difference data $GD_{iter}^i = Image_{iter}^i - Image^i$ is calculated. In operation S705, a distribution rule of difference values of each pixel in $GD_{iter}^i$ is statistically calculated. For example, the method, in operation S705, statistically calculates frequencies of each value in the GD. In operation S706, Gaussian distribution parameters $\mu_{iter}^i$ and $\sigma_{iter}^i$ corresponding to $GD_{iter}^i$ are fitted. Accordingly, the above operations S703-706 from the iterative calculation to fitting the Gaussian distribution parameters are repeated k times, so as to achieve all iterative calculations for the one sample fingerprint image. For example, in operation S707, the method determines whether operations S703-S706 have been repeated k times so as to achieve all iterative calculations for the one sample fingerprint image. If the method determines, in operation S707, that operations S703-S706 have not been repeated k times, "No," the method returns to operations S703-S706. If the method determines, in operation S707, that operations S703-S706 have been repeated k times, "Yes," the method continues to operation S708.

Afterwards, in operation S708, in order to obtain the average of the Gaussian distribution parameters corresponding to each iteration, the average of the Gaussian distribution parameters can be calculated once after each sample fingerprint image is calculated (refer to FIG. 7), or the average of the Gaussian distribution parameters corresponding to each iteration can be calculated after all of m sample fingerprint images have been calculated iteratively, and the results are the same. The specific calculation formulae are:

$$\bar{\mu}_{iter} = \frac{1}{m}\sum_{i=1}^{i=m} \mu_{iter}^i,$$

$$\bar{\sigma}_{iter} = \frac{1}{m}\sum_{i=1}^{i=m} \sigma_{iter}^i.$$

A list of Gaussian distribution parameters $P=\{(\bar{\mu}_{iter=1}, \bar{\sigma}_{iter=1}), \ldots, (\bar{\mu}_{iter=k}, \bar{\sigma}_{iter=k})\}$ is output.

In operation S709, the method, according to some example embodiments, determines whether a new sample input fingerprint image is input. For example, in operation S709, when no new sample fingerprint image is input, the method enters the fingerprint generating stage (e.g., the fingerprint generating operation, S710-S714). In the fingerprint generating stage, in operation S710, a reference fingerprint image $Image^j$ that is ready to generate a simulated fingerprint image is input. Then, in operation S711 $GD_{iter}^j$ is generated by performing one sampling with $\bar{\mu}_{iter}$ and $\bar{\sigma}_{iter}$ as the Gaussian distribution parameters, where iter=(1, ..., k), and, in operation S712, the simulated fingerprint image $Image_{iter}^j = Image^j + GD_{iter}^j$, is generated. For example, in operation S711, the method performs Gaussian sampling by taking an average of the Gaussian distribution parameters as the parameter and generates GD. In operation S712, the method superimposes the generated GD on the reference fingerprint image to generate a simulated fingerprint image. The operations of generating $GD_{iter}^j$ and $Image_{iter}^j$, operations S711 and S712, are repeated k times, and, in operation S714, a list of the simulated fingerprint images generated based on the reference fingerprint image $\{Image_{iter=1}^j, \ldots, Image_{iter=k}^j\}$ is output. For example, in operation S713, the method determines whether operation S711 and S712 have repeated k times, if "No" operations S711 and S712 continue to repeat (e.g., iterate), and if "Yes," the method outputs a list of generated simulated fingerprint images in operation S714.

Figure 8:
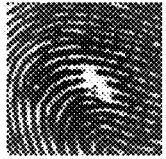
FIG. 8 illustrates a comparison diagram of verification results of a fingerprint image generating method at a plurality of iterations according to some example embodiments.
Figure 8:
Figure 8:
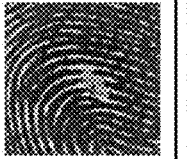
Figure 8:
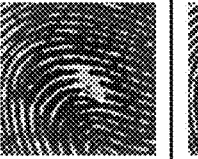
Figure 8:

Referring to FIG. 8, the fingerprint algorithm applied on a bank card is used to verify the fingerprint image generating method of the above example embodiments. As illustrated in FIG. 8, the experiment verifies the effectiveness of quantization and generalization of the liveness score on a dataset of ALGINATE (sodium alginate) material. The image size of this dataset is 114*114, and a PAD recognition model used in the experiment is a CNN (Convolutional Neural Network) model, specifically a MobilNetV1 model. A number of sample fingerprint images for the GA iterations is m=10, and a number of the GA iterations is k=10000.

To evaluate the effectiveness of the method, a visual inspection is performed on the generated simulated fingerprint images. FIG. 8 illustrates results of comparisons of the reference fingerprint image made of ALGINATE material and the simulated fingerprint image generated at different iterations (e.g., at 1,000 iterations, 3,000 iterations, 5,000 iterations, 6,000 iterations). The generated simulated fingerprint image has a relatively constant ridge thickness and an appropriate contrast, while maintaining a shape of the original fingerprint image. The results show that the generated simulated fingerprint images are determined by the PAD recognition model as results of different liveness scores while retaining their original shape. Compared with the original reference fingerprint images, all Match Scores are greater than a similarity threshold of 170000.

It should be noted herein that, in a conventional process of fingerprint recognition is to first determine the authenticity of the fingerprint, and then perform the fingerprint matching when the fingerprint is true to determine whether it is the fingerprint of the individual. Therefore, in conventional practice, it is often that the fingerprint of the individual is falsified. If the matching score of the simulated fingerprint image generated by the method according to some example embodiments of the present inventive concepts is lower than the similarity threshold, meaning the simulated fingerprint image does not match the fingerprint of the individual, the significance of falsification will be lost, and thus the generated simulated fingerprint image may not have a practical significance. Therefore, the matching score needs to be sufficiently large.

In some example embodiments, to evaluate the actual effectiveness of the method, a quantitative evaluation is also conducted on the generated simulated fingerprint images. The liveness scores of the simulated fingerprint image synthesized by the GD generated by the Gaussian sampling are distributed within the entire liveness score range of 0 to 100, as shown in FIG. 6.

Figure 9:
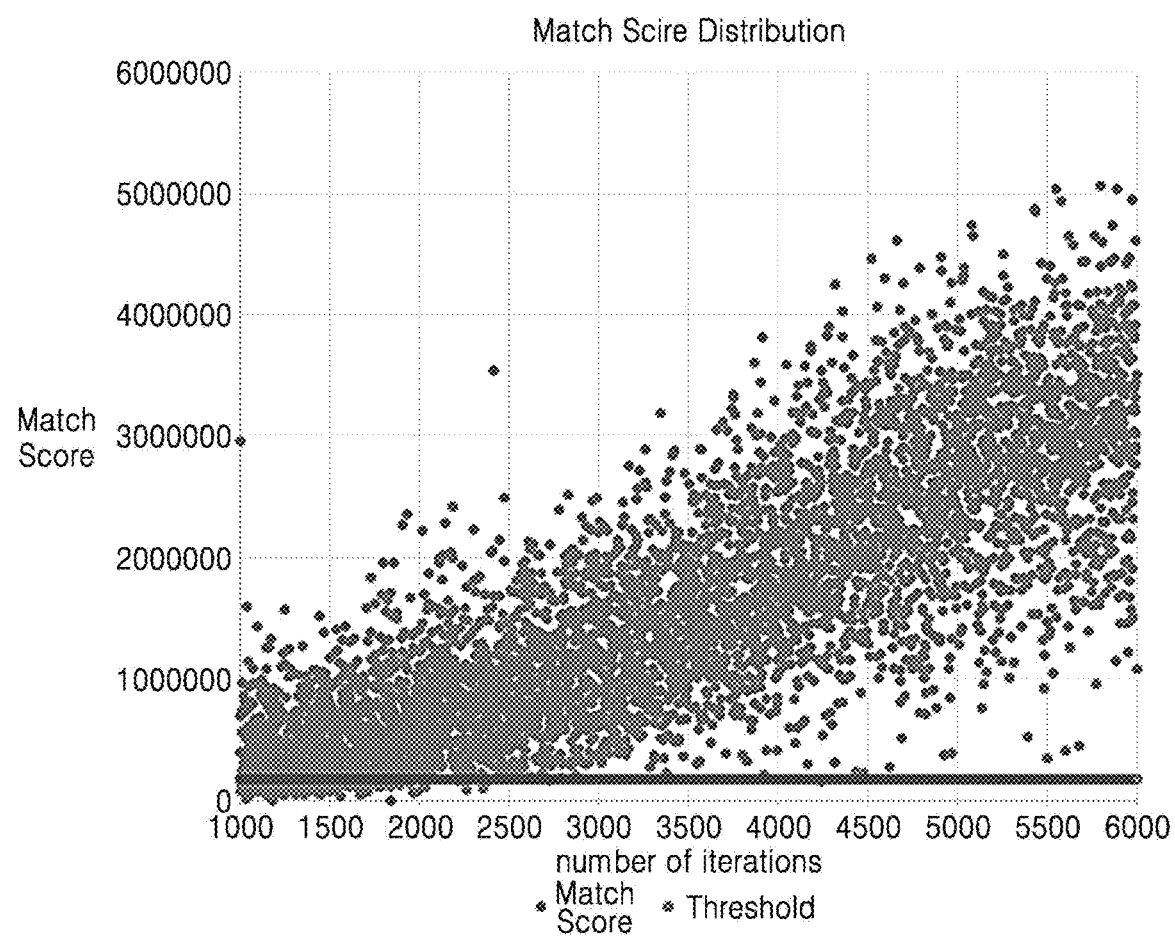
FIG. 9 illustrates a schematic diagram of a distribution of matching scores between simulated fingerprint images and reference fingerprint images according to some example embodiments.

According to some example embodiments, in the statistic of comparison results of the matching scores between the generated simulated fingerprint images and the reference fingerprint images, 87.86% (4393/5000) of the images are greater than the similarity threshold (170000), as shown in FIG. 9.

Figure 10:
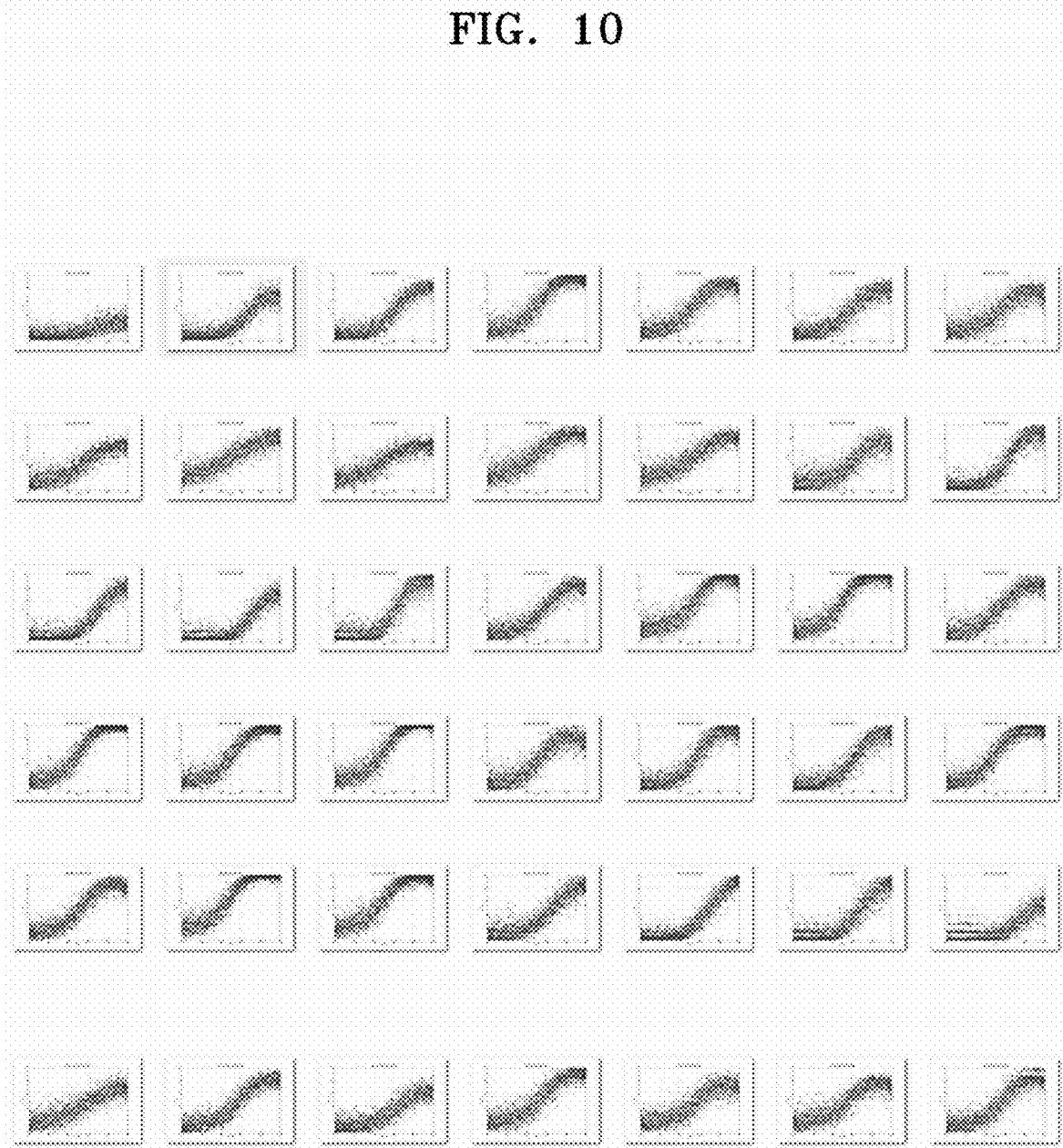
FIG. 10 illustrates a diagram of verification results of a fingerprint generating method on the ALGINATE material dataset according to some example embodiments.

This method, according to some example embodiments, randomly selects 1000 images on the dataset of ALGINATE material, and the universal applicability of the fingerprint image generating method according to some example embodiments is verified. FIG. 10 illustrates the distribution of the liveness scores of the simulated fingerprint images generated by this method based on a plurality of fake fingerprint images made of untrained materials. It should be understood that there are many types of PAI materials. For materials used in the GA iterations (e.g., trained materials), the simulated fingerprint images generated by using fake fingerprints made of these materials as the reference fingerprint images often conform to the rule of FIG. 6, and a batch of simulated fingerprint images that are continuously distributed and cover the entire range of liveness scores is obtained. However, in some example embodiments, for the untrained materials (such as the ALGINATE material herein), this rule may not be conformed to, as shown in a first example in FIG. 10. Based on this, a proportion of the reference fingerprint images that conform to the rule of FIG. 6 among all the reference fingerprint images involved in the generation of the fingerprints can be statistically calculated as the effectiveness of this method. After the calculation, the effectiveness of this method in this verification is 95.2% (952/1000).

The fingerprint image generating method according to some example embodiments of the present inventive concepts has been described in conjunction with FIGS. 1 to 10. In the following text, a fingerprint image generating device and its units (e.g., components) according to some example embodiments of the present inventive concepts will be described with reference to FIG. 11.

Figure 11:
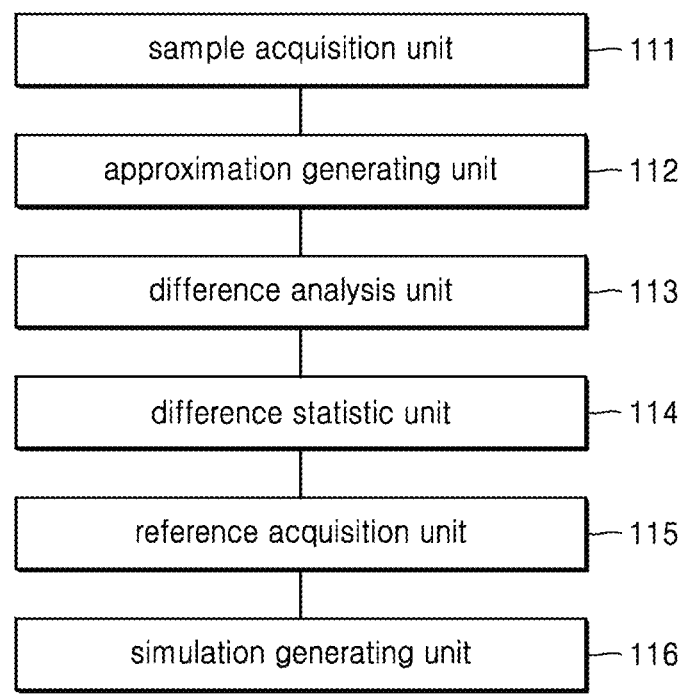
FIG. 11 illustrates a block diagram of a fingerprint image generating device according to some example embodiments.

FIG. 11 illustrates a block diagram of a fingerprint image generating device according to some example embodiments.

Referring to FIG. 11, the fingerprint image generating device may include a sample acquisition unit 111, an approximation generating unit 112, a difference analysis unit 113, a difference statistic unit 114, a reference acquisition unit 115, and a simulation generating unit 116.

According to some example embodiments, the sample acquisition unit 111, approximation generating unit 112, difference analysis unit 113, difference statistic unit 114, reference acquisition unit 115, and simulation generation unit 116 of the fingerprint generating device may include, may be included in, and/or may be implemented by one or more instances of processing circuitry such as hardware including logic circuits; a hardware/software combination such as a processor executing software; or a combination thereof. In some example embodiments, the processing circuitry may also include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, electronic devices, modules, units, and/or portions thereof according to any of the example embodiments.

The sample acquisition unit 111 is configured to obtain M sample fingerprint images.

The approximation generating unit 112 is configured to generate N approximate images according to N target similarities based on each of the M sample fingerprint images, wherein the target similarity is a similarity between the approximate image and the sample fingerprint image on which the approximate image is based.

In some example embodiments, the approximation generating unit 112 is configured to obtain the N approximate images corresponding to the sample fingerprint images by performing iterative calculation using an evolutionary algorithm, by respectively taking each of the M sample fingerprint images as a reference, wherein each of the N approximate images corresponds to one iteration; and wherein the target similarity is represented by a number of iterations of the approximate image corresponding to an associated difference parameter.

In some example embodiments, in the evolutionary algorithm, a structural similarity between a plurality of candidate images generated in each iteration and the sample fingerprint image as the reference is used as a fitness of the corresponding candidate image, and the approximate image in the corresponding iteration is selected from the plurality of candidate images according to the fitness.

In some example embodiments, the evolutionary algorithm includes a genetic algorithm.

The difference analysis unit 113 is configured to analyze a difference between each of the sample fingerprint images and each of the corresponding generated approximate images, to obtain (M×N) difference parameters, wherein each difference parameter is used to quantify the difference between one sample fingerprint image and one approximate image, and the difference parameter is associated with the similarity between the represented sample fingerprint image and the approximate image, so that each target similarity is associated with M difference parameters.

In some example embodiments, the difference analysis unit 113 is configured to: take (e.g., obtain, receive, etc.) one sample fingerprint image and one corresponding generated approximate image as one image pair, so as to form (M×N) image pairs; calculate differences in pixel values for each image pair at corresponding pixel points as difference values; with respect to each image pair, analyze a distribution rule of the difference values on each pixel point, and obtain a parameter describing the distribution rule as the difference parameter of the image pair, so as to obtain the (M×N) difference parameters.

In some example embodiments, the difference analysis unit 113 is configured to: with respect to each image pair, perform frequency statistical analysis on the difference values at each pixel point, and obtain probability distribution parameters as the difference parameters of the image pair by a fitting operation, so as to obtain the (M×N) difference parameters.

In some example embodiments, the probability distribution parameters include normal distribution parameters.

The difference statistical unit 114 is configured to statistically calculate the M difference parameters respectively associated with P specified similarities among the N target similarities respectively, so as to obtain difference statistical parameters respectively corresponding to the P specified similarities.

In some example embodiments, the difference statistical unit 114 is configured to respectively statistically calculate M difference parameters associated with the N target similarities respectively, so as to obtain the difference statistical parameters of the N target similarities; and the fingerprint image generating device further includes: a verification acquisition unit configured to obtain a plurality of verified fingerprint images; a verification generating unit configured to generate simulated fingerprint images respectively corresponding to the N target similarities according to the verified fingerprint images and the difference statistical parameters respectively corresponding to the N target similarities, with respect to each of the plurality of verified fingerprint images; a score determination unit configured to determine liveness scores of the simulated fingerprint images respectively corresponding to the N target similarities; and a verification screening unit configured to select the P specified similarities from the N target similarities according to the liveness scores and a preset screening condition.

In some example embodiments, P specified similarities is greater than 1, and the P specified similarities is a continuous interval in a similarity interval composed of the N target similarities; and the preset screening condition includes: with respect to at least some verified fingerprint images, the liveness scores of the simulated fingerprint images corresponding to the P specified similarities are continuously distributed and cover a specified liveness score interval.

The reference acquisition unit 115 is configured to obtain a reference fingerprint image.

The simulation generating unit 116 is configured to generate the simulated fingerprint images respectively corresponding to the P specified similarities according to the reference fingerprint image and the difference statistical parameters respectively corresponding to the P specified similarities.

Both M and N are integers greater than 1, and P is an integer greater than or equal to 1.

According to some example embodiments of the present inventive concepts, there is also provided a computer readable storage medium (e.g., a memory) stored therein with a computer program. When the computer program is performed, the fingerprint image generating method according to some example embodiments may be implemented.

In some example embodiments, the computer readable storage medium (e.g., memory) can carry (e.g., can be configured to store) one or more programs that, when executed, may implement: obtaining M sample fingerprint images; generating N approximate images according to N target similarities based on each of the M sample fingerprint images, wherein the target similarity is a similarity between the approximate image and the sample fingerprint image on which the approximate image is based; analyzing a difference between each of the sample fingerprint images and each of the corresponding generated approximate images, to obtain (M×N) difference parameters, wherein each difference parameter is used to quantify the difference between one sample fingerprint image and one approximate image, and the difference parameter is associated with the similarity between the represented sample fingerprint image and the approximate image, so that each target similarity is associated with M difference parameters; statistically calculating the M difference parameters respectively associated with P specified similarities among the N target similarities respectively, so as to obtain difference statistical parameters respectively corresponding to the P specified similarities; obtaining a reference fingerprint image; generating simulated fingerprint images respectively corresponding to the P specified similarities according to the reference fingerprint image and the difference statistical parameters respectively corresponding to the P specified similarities, wherein M and N are integers greater than 1, and P is an integer greater than or equal to 1.

According to some example embodiments, the computer readable storage medium (e.g., memory) may be, for example, but is not limited to, an electronic, magnetic, optical, electromagnetic, infrared, or semiconductor system, device, or, equipment or any combination of the above. More specific examples of computer readable storage media may include, but are not limited to, electrical connections having one or more wires, portable computer disks, hard disks, random access memory (RAM), read only memory (ROM), erasable Programmable read only memory (EPROM or flash memory), optical fiber, portable compact disk read only memory (CD-ROM), optical storage device, magnetic storage device, or any suitable combination of the above mentioned. In some example embodiments of the present inventive concepts, the computer readable storage medium may be any tangible medium that can contain or store a computer program, which can be used by or in connection with an instruction execution system, device, or, equipment. The computer program embodied on the computer readable storage medium can be transmitted by any suitable medium, including but not limited to: wire, fiber optic cable, RF (radio frequency), etc., or any suitable combination of the foregoing. The computer readable storage medium can be included in any device; it can also be separately and not incorporated into the device.

According to some example embodiments of the present inventive concepts, there is also provided a computer program product, and instructions in the computer program product may be executed by a processor of a computer apparatus to accomplish the fingerprint image generating method according to some example embodiments of the present inventive concepts.

The fingerprint image generating device according to some example embodiments has been described above in combination with FIG. 11. Hereinafter, a computing device according to some example embodiments of the present inventive concepts will be described with reference to FIG. 12.

Figure 12:
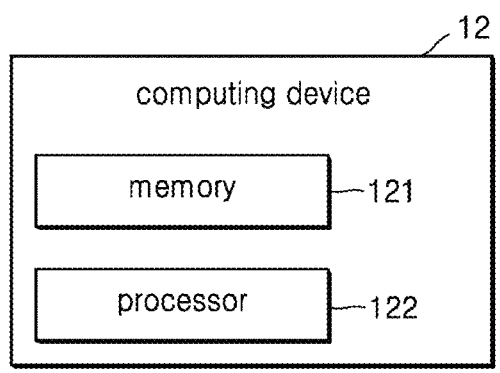
FIG. 12 illustrates a schematic diagram of a computing device according to some example embodiments.

FIG. 12 illustrates a schematic diagram of a computing device according some example embodiments.

Referring to FIG. 12, the computing device 12 according to some example embodiments may include a memory 121 and a processor 122. The memory 121 may store or be configured to store a computer program, wherein the computer program, when executed by the processor 122, implements the fingerprint image generating method according to some example embodiments of the present inventive concepts.

In some example embodiments, the memory 121 may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

In some example embodiments of the present inventive concepts, the computer program, when executed by the processor 122, may implement the following operations: obtaining M sample fingerprint images; generating N approximate images according to N target similarities based on each of the M sample fingerprint images, wherein the target similarity is a similarity between the approximate image and the sample fingerprint image on which the approximate image is based; analyzing a difference between each of the sample fingerprint images and each of the corresponding generated approximate images, to obtain (M×N) difference parameters, wherein each difference parameter is used to quantify the difference between one sample fingerprint image and one approximate image, and the difference parameter is associated with the similarity between the represented sample fingerprint image and the approximate image, so that each target similarity is associated with M difference parameters; statistically calculating the M difference parameters respectively associated with P specified similarities among the N target similarities respectively, so as to obtain difference statistical parameters respectively corresponding to the P specified similarities; obtaining a reference fingerprint image; generating simulated fingerprint images respectively corresponding to the P specified similarities according to the reference fingerprint image and the difference statistical parameters respectively corresponding to the P specified similarities, wherein M and N are integers greater than 1, and P is an integer greater than or equal to 1.

The computing device according to some example embodiments may include but is not limited to devices such as mobile phone, notebook computer, PDA (personal digital assistant), PAD (tablet computer), and the like. The computing device shown in FIG. 12 is only an example, and should not impose any limitation to the functions and scope of use of the example embodiment of the present inventive concepts.

The fingerprint image generating method and device according to some example embodiments of the present inventive concepts have been described above with reference to FIGS. 1 to 12. However, it should be understood that the fingerprint image generating device and its units illustrated in FIG. 11 may be respectively configured as software, hardware, firmware, or any combination of the above items for performing specific functions. The computing device shown in FIG. 12 includes, but is not limited to, the components shown above. Some components may be added or deleted as needed, and the above components may also be combined.

The fingerprint image generating method and device according to some example embodiments of the present inventive concepts find that the similarity between the sample fingerprint image used as the reference and its approximate image is significantly correlated with the liveness score of the approximate image, after preliminary analysis. Based on this, the approximate images with the same target similarity are generated for a plurality of sample fingerprint images, and the differences between each approximate image and the corresponding sample fingerprint image are statistically calculated to obtain the difference statistical parameter. The difference statistical parameter can be used to represent the difference between any reference image and its approximate image under the target similarity. Meanwhile, in some example embodiments, the target similarity and the liveness score of the approximate image show a significant correlation, which means that the difference statistical parameter can represent the difference between any reference image and its approximate image under the relevant liveness score. On this basis, with respect to the reference fingerprint image, a new fingerprint image is generated by combining with the difference statistical parameter corresponding to the specified similarity, denoted as the simulated fingerprint image, which can have the liveness score related to the specified similarity. Since the method according to some example embodiments can obtain the difference statistical parameters corresponding to the different target similarities (or the different liveness scores) using a small number of sample fingerprint images, and can directly reuse these statistical parameters to quickly generate the simulated fingerprint images with the required liveness scores based on any reference fingerprint image, it can achieve fast acquisition of the simulated fingerprint images with different liveness scores at low cost.

Although the present inventive concepts have been shown and described with reference to some exemplary embodiments thereof, it will be understood by those skilled in the art that various changes in form and details may be made therein without departing from the spirit and scope of the present inventive concepts as defined by the following claims.

What is claimed is:

1. A fingerprint image generating device, comprising:
processing circuitry, the processing circuitry configured to
obtain M sample fingerprint images;
generate N approximate images according to N target similarities based on each of the M sample fingerprint images, each of the N target similarities being a similarity value between a respective one of the N approximate images and a respective one of the M sample fingerprint images on which the respective one of the N approximate images is based, M and N being integers greater than 1;
analyze a difference between each one of the M sample fingerprint images and the respective one of the N approximate images, to obtain (M×N) difference parameters, each one of the (M×N) difference parameters quantifying a difference between each one of the respective M sample fingerprint images and the respective N approximate images, each one of the (M×N) difference parameters being associated with the similarity value between the respective one of the M sample fingerprint images and the respective one of the N approximate images, such that each of the N target similarities is associated with M difference parameters;
statistically calculate the M difference parameters respectively associated with P similarities among the N target similarities respectively to obtain difference statistical parameters respectively corresponding to the P similarities, P being an integer greater than or equal to 1;
obtain a reference fingerprint image; and
generate simulated fingerprint images respectively corresponding to the P similarities based on the reference fingerprint image and the difference statistical parameters respectively corresponding to the P similarities.

2. The fingerprint image generating device of claim 1, wherein the processing circuitry is configured to:
obtain the N approximate images corresponding to the M sample fingerprint images by performing iterative calculations using an evolutionary algorithm, by respectively taking each of the M sample fingerprint images as a reference, wherein each of the N approximate images corresponds to one iteration; and
wherein each one of the N target similarities is represented by a number of iterations of the respective one of the N approximate images corresponding to an associated one of the M difference parameters.

3. The fingerprint image generating device of claim 2, wherein, in the evolutionary algorithm, a structural similarity between a plurality of candidate images generated in each iteration and the reference is a fitness value of a corresponding candidate image of the plurality of candidate images, and the respective one of the N approximate images in a corresponding iteration is selected from the plurality of candidate images according to the fitness value.

4. The fingerprint image generating device of claim 2, wherein the evolutionary algorithm comprises a genetic algorithm.

5. The fingerprint image generating device of claim 1, wherein the processing circuitry is configured to:
respectively take each of the M sample fingerprint images and the respective one of the N approximate images as one image pair, to form (M×N) image pairs;
calculate differences in pixel values for each one of the (M×N) image pairs at corresponding pixel points as difference values; and
with respect to each one of the (M×N) image pairs, analyze a distribution rule of the difference values at each pixel point, and obtain a parameter describing the distribution rule as a (M×N) difference parameter of the respective one of the (M×N) image pairs to obtain the (M×N) difference parameters.

6. The fingerprint image generating device of claim 5, wherein the processing circuitry is configured to:
with respect to each one of the (M×N) image pairs, perform frequency statistical analysis on the difference values at each pixel point, and obtain probability distribution parameters as the (M×N) difference parameter of the respective one of the (M×N) image pairs by a fitting operation to obtain the (M×N) difference parameters.

7. The fingerprint image generating device of claim 6, wherein the probability distribution parameters comprise normal distribution parameters.

8. The fingerprint image generating device of claim 1, wherein
the processing circuitry is configured to:
respectively statistically calculate the M difference parameters respectively associated with the N target similarities to obtain the difference statistical parameters of the N target similarities;
obtain a plurality of verified fingerprint images;
generate simulated fingerprint images respectively corresponding to the N target similarities according to the verified fingerprint images and the difference statistical parameters respectively corresponding to the N target similarities, with respect to each of the plurality of verified fingerprint images;
determine liveness scores of the simulated fingerprint images respectively corresponding to the N target similarities; and
select the P similarities from the N target similarities according to the liveness scores and a screening condition.

9. The fingerprint image generating device of claim 8, wherein P is greater than 1, and the P similarities are a continuous interval in a similarity interval composed of the N target similarities; and
the screening condition includes, with respect to at least some verified fingerprint images, the liveness scores of the simulated fingerprint images corresponding to the P similarities continuously distributed over a liveness score interval.

10. A computing device, comprising:
at least one processor; and
at least one memory configured to store a computer program, the computer program, when executed by the at least one processor, is configured to
obtain M sample fingerprint images,
generate N approximate images according to N target similarities based on each of the M sample fingerprint images, each of the N target similarities being a similarity value between a respective one of the N approximate images and a respective one of the M sample fingerprint images on which the respective one of the N approximate images is based, M and N being integers greater than 1,
analyze a difference between each one of the M sample fingerprint images and the respective one of the N approximate images, to obtain (M×N) difference parameters, each one of the (M×N) difference parameters quantifying a difference between each one of the respective M sample fingerprint image and the respective N approximate images, each one of the (M×N) difference parameters being associated with the similarity value between the respective one of the M sample fingerprint images and the respective one of the N approximate images, such that each of the N target similarities is associated with M difference parameters,
statistically calculate the M difference parameters respectively associated with P similarities among the N target similarities respectively, to obtain difference statistical parameters respectively corresponding to the P similarities, P being an integer greater than or equal to 1,
obtain a reference fingerprint image, and
generate simulated fingerprint images respectively corresponding to the P similarities based on the reference fingerprint image and the difference statistical parameters respectively corresponding to the P similarities.

11. A fingerprint image generating method, comprising:
obtaining M sample fingerprint images;
generating N approximate images according to N target similarities based on each of the M sample fingerprint images, each of the N target similarities being a similarity value between a respective one of the N approximate images and a respective one of the M sample fingerprint images on which the respective one of the N approximate images is based, M and N being integers greater than 1;
analyzing a difference between each one of the M sample fingerprint images and the respective one of the N approximate images, to obtain (M×N) difference parameters, each one of the (M×N) difference parameters quantifying a difference between each one of the respective M sample fingerprint images and the respective N approximate images, each one of the (M×N) difference parameters being associated with the similarity value between the respective one of the M sample fingerprint images and the respective one of the N approximate images, such that each of the N target similarities is associated with M difference parameters;
statistically calculating the M difference parameters respectively associated with P similarities among the N target similarities respectively to obtain difference statistical parameters respectively corresponding to the P similarities, P being an integer greater than or equal to 1;
obtaining a reference fingerprint image; and
generating simulated fingerprint images respectively corresponding to the P similarities based on the reference fingerprint image and the difference statistical parameters respectively corresponding to the P similarities.

12. The fingerprint image generating method of claim 11, wherein the generating of the N approximate images according to the N target similarities based on each of the M sample fingerprint images comprises:
- obtaining the N approximate images corresponding to the M sample fingerprint images by performing iterative calculations using an evolutionary algorithm, by respectively taking each of the M sample fingerprint images as a reference, wherein each of the N approximate images corresponds to one iteration; and
- wherein each one of the N target similarities is represented by a number of iterations of the respective one of the N approximate images corresponding to an associated one of the M difference parameters.

13. The fingerprint image generating method of claim 12, wherein, in the evolutionary algorithm, a structural similarity between a plurality of candidate images generated in each iteration and the reference is a fitness value of a corresponding candidate image of the plurality of candidate images, and the respective one of the N approximate images in a corresponding iteration is selected from the plurality of candidate images according to the fitness value.

14. The fingerprint image generating method of claim 12, wherein the evolutionary algorithm comprises a genetic algorithm.

15. The fingerprint image generating method of claim 11, wherein the analyzing the difference between each of the M sample fingerprint images and the respective one of the N approximate images, to obtain the (M×N) difference parameters, comprises:
- respectively taking each of the M sample fingerprint images and the respective one of the N approximate images as one image pair, to form (M×N) image pairs;
- calculating differences in pixel values for each one of the (M×N) image pairs at corresponding pixel points as difference values; and
- with respect to each one of the (M×N) image pairs, analyzing a distribution rule of the difference values at each pixel point, and obtaining a parameter describing the distribution rule as a (M×N) difference parameter of the respective one of the (M×N) image pairs to obtain the (M×N) difference parameters.

16. The fingerprint image generating method of claim 15, wherein with respect to each one of the (M×N) image pairs, the analyzing the distribution rule of the difference values on each pixel point, and the obtaining the parameter describing the distribution rule as the (M×N) difference parameter, comprise:
- with respect to each one of the (M×N) image pairs, performing frequency statistical analysis on the difference values at each pixel point, and obtaining probability distribution parameters as the (M×N) difference parameter of the respective one of the (M×N) image pairs by a fitting operation to obtain the (M×N) difference parameters.

17. The fingerprint image generating method of claim 16, wherein the probability distribution parameters comprise normal distribution parameters.

18. The fingerprint image generating method of claim 11, further comprising:
- respectively statistically calculating the M difference parameters respectively associated with the N target similarities to obtain the difference statistical parameters of the N target similarities;
- obtaining a plurality of verified fingerprint images;
- with respect to each of the plurality of verified fingerprint images, generating simulated fingerprint images respectively corresponding to the N target similarities according to the verified fingerprint images and the difference statistical parameters respectively corresponding to the N target similarities;
- determining liveness scores of the simulated fingerprint images respectively corresponding to the N target similarities; and
- selecting the P similarities from the N target similarities according to the liveness scores and a screening condition.

19. The fingerprint image generating method of claim 18, wherein P is greater than 1, and the P similarities are a continuous interval in a similarity interval composed of the N target similarities; and
- the screening condition includes, with respect to at least some verified fingerprint images, the liveness scores of the simulated fingerprint images corresponding to the P similarities continuously distributed over a liveness score interval.

20. A non-transitory computer readable storage medium storing a computer program, wherein the computer program, when executed by a processor, is configured to implement the fingerprint image generating method of claim 11.

21. A computer program product comprising instructions, wherein the instructions, when executed by a processor of a computer apparatus, implement the fingerprint image generating method of claim 11.

* * * * *